United States Patent
Moon

(10) Patent No.: US 7,458,710 B2
(45) Date of Patent: Dec. 2, 2008

(54) BACKLIGHT UNIT USING OPTICAL FIBERS

(75) Inventor: Jeong Min Moon, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 153 days.

(21) Appl. No.: 11/645,701

(22) Filed: Dec. 27, 2006

(65) Prior Publication Data

US 2008/0002393 A1 Jan. 3, 2008

(30) Foreign Application Priority Data

Jun. 28, 2006 (KR) .................. 10-2006-0058943

(51) Int. Cl.
*F21V 7/04* (2006.01)

(52) U.S. Cl. ...................................... 362/615

(58) Field of Classification Search ............... 362/628, 362/629, 555, 615; 385/114
See application file for complete search history.

(56) References Cited

U.S. PATENT DOCUMENTS 7,151,879 B2 * 12/2006 Ishikawa et al. ............. 385/114
2007/0153545 A1 * 7/2007 Lee ............................. 362/610

* cited by examiner

*Primary Examiner*—Sandra O'Shea
*Assistant Examiner*—James W Cranson
(74) *Attorney, Agent, or Firm*—McKenna Long & Aldridge LLP

(57) ABSTRACT

A backlight unit using optical fibers includes a light source, an optical medium tube having a light incident surface to optically couple light from the light source into the optical medium tube and a light emitting surface to emit light guided by the optical medium tube, a light emitting plate including plurality of optical fibers having first ends optically coupled to the light emitting surface of the optical medium tube to receive light from the light emitting surface, where the first ends of the optical fibers are substantially parallel and coplanar with each other.

21 Claims, 19 Drawing Sheets

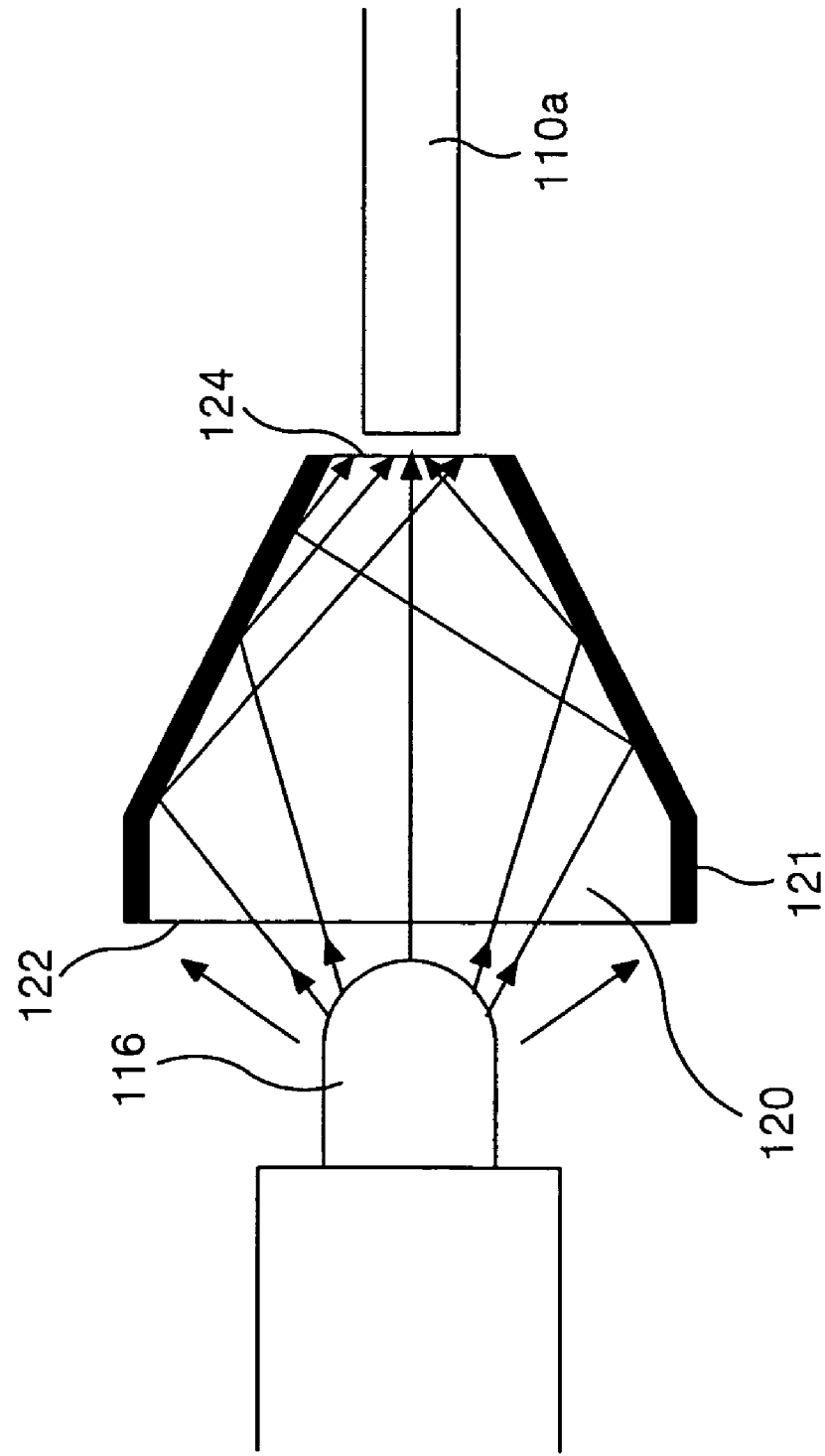

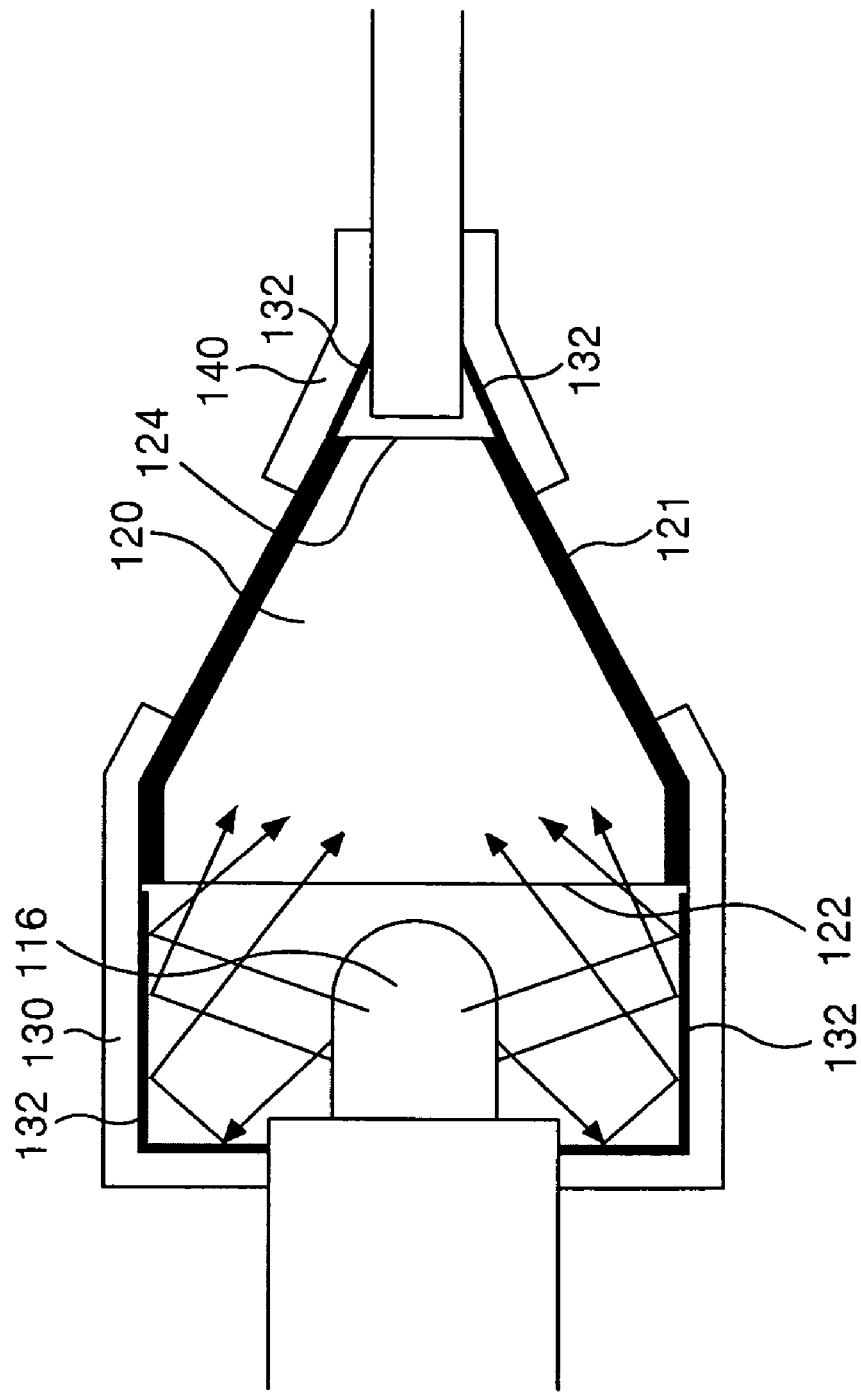

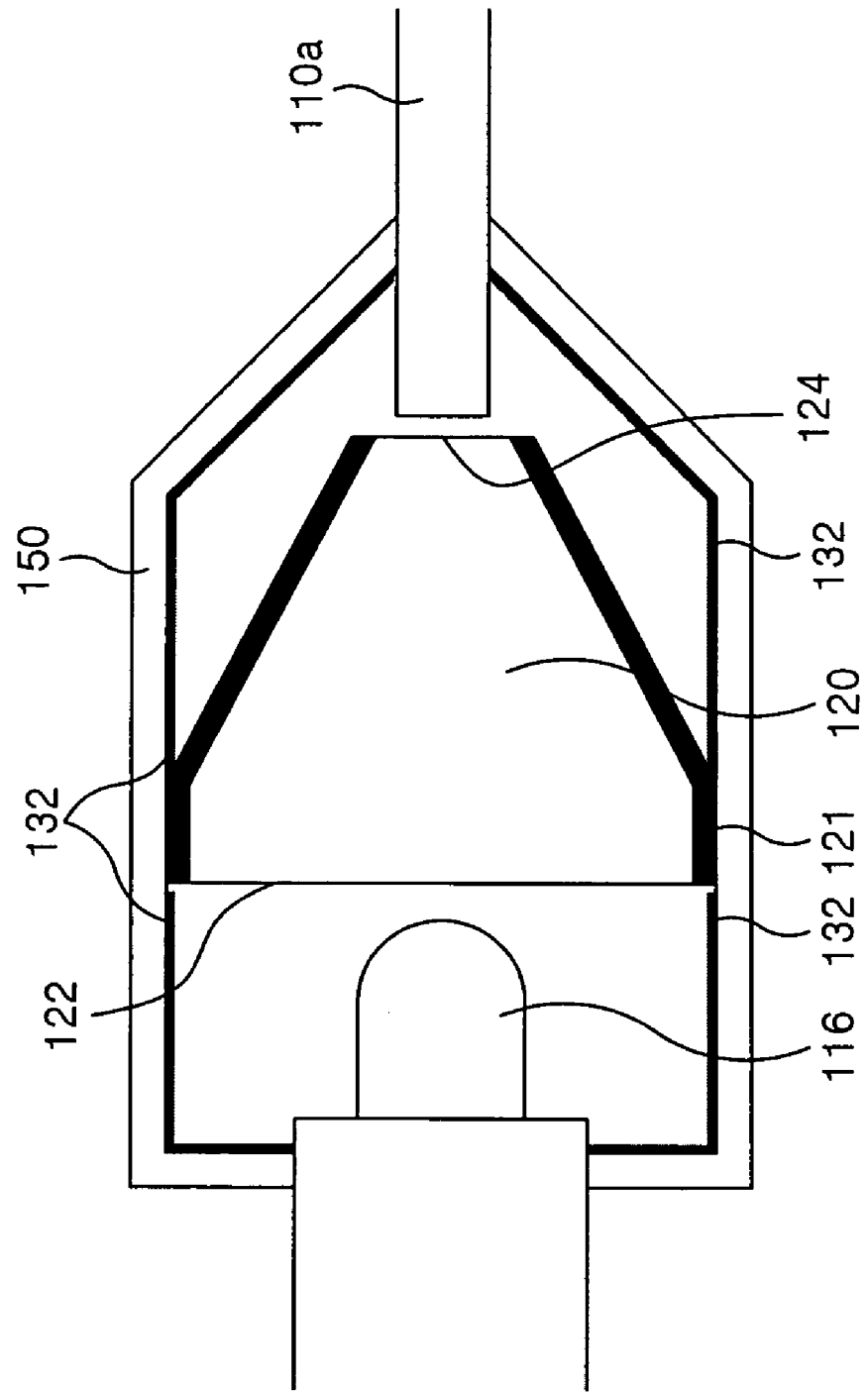

BACKLIGHT UNIT USING OPTICAL FIBERS

This application claims the benefit of Korean Patent Application No. 10-2006-0058943, filed on Jun. 28, 2006, which is hereby incorporated by reference for all purposes as if fully set forth herein.

BACKGROUND OF THE INVENTION

1. Field of the Invention

The present invention relates to a backlight unit and in particular to a backlight unit using optical fibers.

2. Discussion of the Related Art

Flat panel display device are typically very thin and light, making them particularly well suited for application as the display for portable data devices such as notebook computers, mobile phones, and PDAs. The liquid crystal display (LCD) device, which is one type of flat panel display device, controls light transmittance of a liquid crystal layer having dielectric anisotropy by applying and controlling an electric field to thereby displaying an image. To this end, the liquid crystal display device includes a liquid crystal display panel having liquid crystal cells arranged in a matrix and the light transmittance is controlled for a liquid crystal cell for each pixel. A backlight unit emits white light onto the liquid crystal display panel to allow the image to be viewed.

For portable applications employing flat panel display devices, it is important that electric power consumption be reduced to a minimum. With the exception of reflective flat panel display devices using ambient light for displaying images, flat panel displays typically employ a backlight unit. The primary determinant of power consumption for flat panel display devices is the electric consumption power is the backlight unit. For example, for a notebook computer hundreds of candela are used to suitably display images on a liquid crystal display device. A light source having high luminescence and capable of delivering uniform brightness over the display area is used to supply the light for a flat panel display device. To this end, a number of backlight systems have been proposed.

Among the proposed systems is a backlight system using optical fibers to transmit light over long distances without loss, and using low electric power consuming light emitting diodes (LEDs) as the light source. The light from the LED can transmitted over a distance and distributed over a relatively large area using the optical fibers. Further, a backlight unit using optical fiber is freely and easily flexed. Therefore, backlight systems employing optical fibers can be used not only with LCD devices using hard substrates but also with flexible LCD devices using soft plastic substrates.

FIG. 1 is a diagram illustrating a flexible backlight unit of the related art, and FIG. 2 is a diagram showing optical fibers of a light emitting plate of the flexible backlight unit of the related art in detail.

Referring to FIGS. 1 and 2, the flexible backlight unit of the related art includes: a light emitting plate 10 formed of a plurality of optical fibers 10A weaved to have a plurality of meandering parts alternatively; a diffusion plate 12 disposed on an upper surface of the light emitting plate 10; a reflection plate 14 disposed in a lower part of the light emitting plate 10; a light source 16 connected to one end of the light emitting plate 10 for emitting light into the optical fibers 10A; and a connection terminal 18 to connect the light emitting plate 10 to the light source 16. In addition, the backlight unit of the related art further includes a plurality of optical sheets (not shown) disposed on the upper part of the diffusion plate 12.

As shown in FIG. 2, the light emitting plate 10 is formed by weaving the optical fibers 10A together with threads 10B having a thickness similar to that of the optical fibers 10A. The optical fibers 10A woven together with the threads 10B are evenly spread out over the width of the light emitting plate 10 so that the light emission area is broadened to cover light emitting plate 10. The ends of the optical fibers are bundled at one end at one side of the light emitting plate 10 and connected to the light source 16 by the connection terminal 18.

The connection terminal 18 transmits the light exiting from the light source 16 to the optical fibers 10A bundled together at the connection terminal.

The diffusion plate 12 is disposed on an upper surface of the light emitting plate 10 to diffuse the light which emitted from the light emitting plate 10.

The reflection plate 14 is disposed at the lower part of the light emitting plate 10 to reflect the light emitted downward from the light emitting plate 10 in an upwards direction towards the lower part of the diffusion plate 12.

The light source 16 is connected through the connection terminal 18 to each of the bundled optical fibers 10A to emit light into the optical fibers 10A.

The flexible backlight unit of the related art, as shown in FIG. 2, includes the optical fibers 10A woven with the thread 10B. Accordingly, the optical fibers 10A are formed into a meandering shape (curved pattern) by the thread 10B woven into the flexible backlight unit, as in FIG. 3. When the light from the light source 16 is emitted to the inside of the optical fibers 10A, the total reflection condition within the optical fibers 10A is disturbed within the curved pattern, and the light emitted into the inside of the optical fibers 10A from the light source 16 is made to exit the optical fibers 10A at the curved portions, allowing the optical fibers to emit light onto the flexible liquid crystal display device.

The flexible backlight unit of related art connects the optical fibers 10A and the light source 16 through the connection terminal 18 so that light emitted from the light source 16 is transmitted into the optical fibers 10A. The optical fibers 10A are tied up into a bundle to connect the optical fibers 10A to the light source 16 through the small connection terminal 18. Accordingly, as shown in FIG. 4, a bundle area A is formed at the location where the optical fibers 10A are tied up in the shape of bundle in the light emitting plate 10 of the flexible backlight unit using the optical fiber of the related art. Accordingly, the flexible liquid crystal display device to which the flexible backlight unit using the optical fiber of the related art is applied has a disadvantage in that a bezel area at least as large as the bundle area A of the light emitting plate 10 is occupied.

As illustrated in FIG. 5, the bezel area is at an outer area of the screen of the liquid crystal display device, and the bezel area becomes uselessly bulky if it is needlessly enlarged, since the bezel area is a non display area in the liquid crystal display device.

In order to reduce the bezel area, the bundle area A of the light emitting plate 10 may folded to the side of the flexible backlight unit as shown in FIG. 6A. However, in the flexible backlight unit using the optical fiber of the related art, the bundle area A of the light emitting plate 10 may be longer than the width W of the light emitting plate 10. Accordingly, there remains an area B having a size corresponding to the difference between the width W of the light emitting plate 10 and size of the bundle area A of the light emitting plate 10 even when the bundle area A of the light emitting plate 10 is folded to the side of the flexible backlight unit. Accordingly, there is a limit to the amount of reduction of the bezel area that can be accomplished by folding the bundle area A of the light emitting plate 10 to the side of the backlight unit.

In another method for reducing the bezel area, the bundle area A of the flexible backlight unit is bent towards the rear of the flexible backlight unit, as shown FIG. 6B. However, in this method of bending the bundle area A of the light emitting plate 10 to the rear of the flexible backlight unit, there is a limit to the amount of reduction of the bezel area that can be accomplished by folding the bundle area, because the sharpness of the bend is limited to prevent the optical fiber from becoming broken by being bent more sharply than a critical value. For example, the an optical fiber may be prevented from bending in an arc having less than a permissible minimum bending radius of 1.6 mm.

SUMMARY OF THE INVENTION

Accordingly, the present invention is directed to a backlight unit using optical fibers that substantially obviates one or more of the problems due to limitations and disadvantages of the related art.

An advantage of the present invention to provide to a backlight unit using optical fibers may allow reducing a bezel area of a display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit using optical fiber according to an aspect of the present invention includes a light source; an optical medium tube having a light incident surface to optically couple light from the light source into the optical medium tube and a light emitting surface to emit light guided by the optical medium tube; a light emitting plate including plurality of optical fibers having first ends optically coupled to the light emitting surface of the optical medium tube to receive light from the light emitting surface, where the first ends of the optical fibers are substantially parallel and coplanar with each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 9A, 9B, and 9C are views illustrating a connection between an optical fiber and a light source by use of an optical medium tube according to the first embodiment of the present invention;

DETAILED DESCRIPTION OF THE ILLUSTRATED EMBODIMENTS

Reference will now be made in detail to embodiments of the present invention, examples of which are illustrated in the accompanying drawings.

Embodiments of the present invention will be explained with reference to FIGS. 7 to 11.

Figure 7:
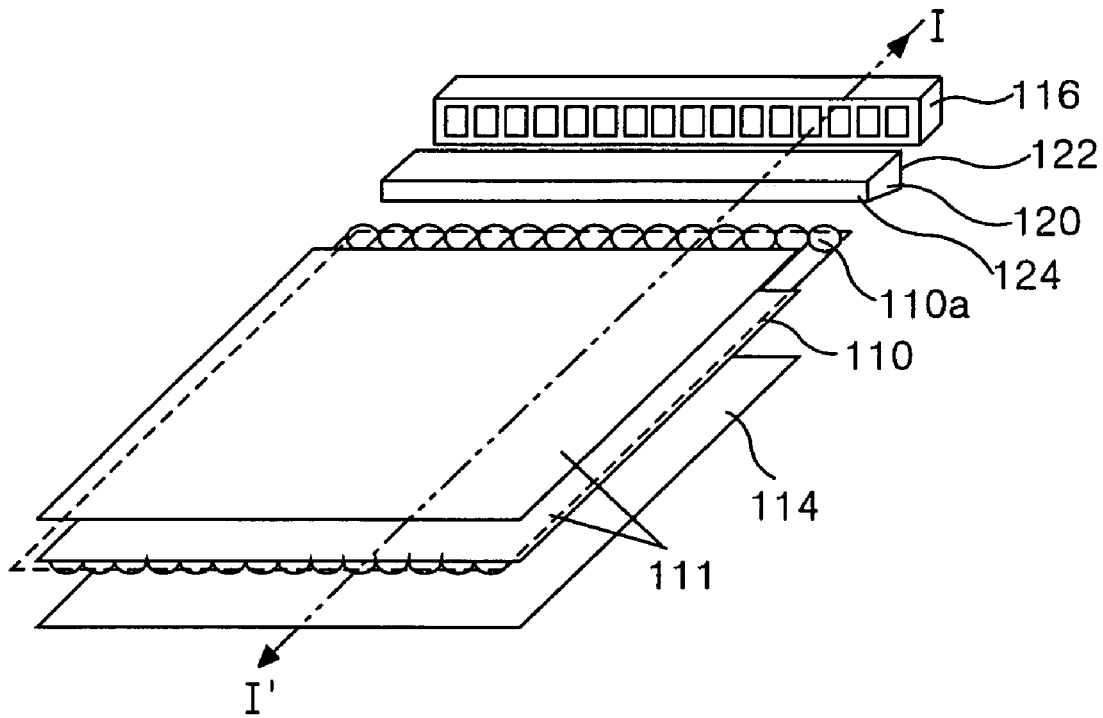
FIG. 7 is a perspective view illustrating a flexible backlight unit using an optical fiber according to a first embodiment of the present invention.
Figure 8:
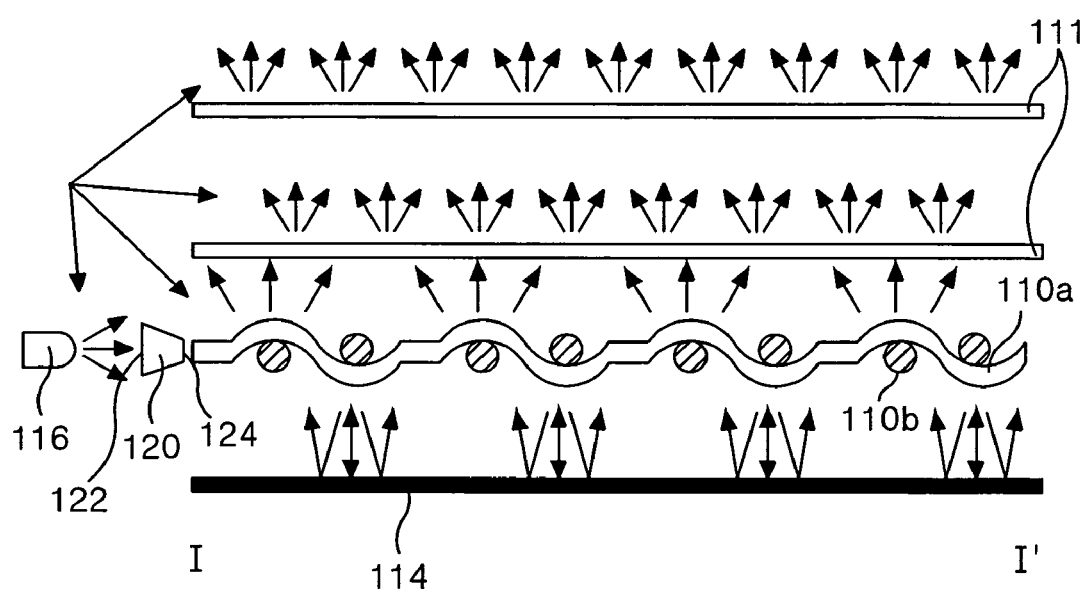
FIG. 8 is a cross sectional view taken along the line I-I' shown in FIG. 7.

FIG. 7 is a perspective drawing illustrating a backlight unit using optical fibers according to a first embodiment of the present invention. FIG. 8 is a cross sectional diagram taken along the line I-I' shown in FIG. 7.

Referring to FIGS. 7 and 8, a backlight unit using optical fibers according to an embodiment of the present invention includes a light emitting plate 110 formed of a plurality of optical fibers 110a each having a plurality of curved parts; a plurality of optical sheets 111 disposed above the upper surface of the light emitting plate 110; a reflection plate 114 disposed below the lower surface of the light emitting plate 110; a light source 116 connected to one end of the light emitting plate 110 for emitting light into the optical fibers 110a; and an optical medium tube 120 which connects the optical fibers 110a with the light source 116.

The light emitting plate 110 is formed by weaving together the optical fibers 110a with threads 110b having a thickness is similar to the thickness of the optical fibers 110a. The optical fibers 110a woven together with the thread 110b are spread apart over the width of the light emitting plate 110 to broaden the light emission area over the light emitting plate 110. One end of each of the optical fibers 110a is connected to the light source 116 by the optical medium tube 120.

The optical sheets 111 may perform the functions of condensing the light emitted from the light emitting plate 110, polarizing the emitted light or scattering the emitted light to be incident with uniform intensity over the display area of a display device.

One side of the optical medium tube 120, as a light incident surface 122, is optically coupled with the light source 116. In other words, the light source 116 is disposed facing the light incident surface 122 and is in close proximity to the light source 116 so that light emitted from the light source is incident on the light incident surface without substantial attenuation. An opposite side of the optical medium tube is a light emitting surface 124, and is optically coupled to a first end of each of the optical fibers 110a, where the first ends of the optical fibers are arranged in a substantially parallel and coplanar arrangement. The optical medium tube 120 allows the light emitted from the light source 116 to be guided to be incident into the first end of all the optical fibers 110a while avoiding or reducing light loss.

The reflection plate 114 is disposed below the light emitting plate 110 to reflect light exiting the lower surface of the light emitting plate 110 towards the upper surface of the light emitting plate 110.

Hereinafter, and with reference to FIGS. 9A, 9B and 9C, detailed descriptions are provided of the optical medium tube 120 and the optical connection of the light source 116 and the optical fibers 110a by use of the optical medium tube 120.

The optical medium tube 120 may be made of a transparent plastic material such as PMMA (polymethyl methacrylate) which is typically used for light guide in the backlight system of the reflective liquid crystal display device. In particular, PMMA has properties facilitating guiding of light to a predetermined direction and scattering the incident light to have a uniform light intensity distribution. The optical medium tube 120 can alternatively be made from polycarbonate or acrylic or other transparent plastic material.

Referring to FIG. 9A, the light source 116 is disposed adjacent to the light incident surface 122 of the light medium tube 120 and facing the light incident surface 122 thereby forming an optical coupling. Further, at a light emitting surface 124 opposite to the light incident surface 122, the optical medium tube 120 is disposed adjacent to a first end of all of the optical fibers 110a arranged in parallel, thereby forming a second optical coupling. The optical medium tube 120 may have a shape of an elongated polyhedron having a polygonal cross section. The length of the optical medium tube 120 may be about the same as or slightly shorter than the width (W) of the light emitting plate 110. The width of the optical medium tube 120 and the space used for housing the light source primarily determine the size of the bezel area. The optical medium tube may be designed to have a minimum width to reduce the size of the bezel. In addition, the size of light source 116 may be minimized. The height of the optical medium tube 120 at the light incident surface 122 may be larger than the diameter of the light source 116 to facilitate receiving light emitted from the light source 116 and may be varied with consideration for the radiating angle of light of the light source 116. On the other hand, the height of the optical medium tube 120 at the light emitting surface 124 may be larger than diameter of the optical fibers 110a to facilitate effectively guiding and converging the light onto the cross sectional surface at the ends of the optical fibers 110a.

The above mentioned size conditions are described an example considering the environmental conditions and the practice of the invention is not limited to an optical medium tube having the described size relationships. The diameter of the light source 116 may for example be 2~3 times larger than that of the optical fibers 110a for effectively condensing the light from the light source 116 to be the incident onto the ends of the optical fibers 110a. However, the sizes of the light incident 122 surface and the light emitting surface 124 may be alternatively be the same or similar. Further, the size of the light emitting surface 124 may be larger than that of the light incident surface 122 of the optical medium tube 120. In this case, a medium layer may be formed around the incident surface of the optical fibers 110a to condense the light more effectively. In addition, to reduce the loss in guiding the incident light from the light incident surface 122 to the light emitting surface, reflective medium layers 121 for ensuring total reflection may be coated on the surfaces of the optical medium tube 120.

The flexible backlight unit according to the embodiment of the present invention illustrated in FIG. 9A couples the light source 116 to the optical fibers 110a by means the optical medium tube 120. Accordingly, the bundle area 'A' associated with the light emitting plate 110 of the related art may be eliminated or omitted. Accordingly, a flexible backlight unit according to embodiments of the present invention may be used with a minimal or reduced sized bezel area.

In addition, as shown in FIG. 9B, at the light incident surface 122 where the optical medium tube 120 and the light source 116 are coupled, a light source housing 130 may be provided to reduce the light loss effectively and to ensure the optical connection between the light source 116 and the light medium tube 120. To facilitate directing light emitted from the light source 116 to the incident surface 122 of the optical medium tube 120, interior surfaces of the light source housing 130 may be coated with a reflecting material 132. In addition, at the light emitting surface 124 at which the light medium tube 120 and the optical fibers 110a are coupled, an optical fiber housing may be provided to enhance the efficiency of the optical coupling between the optical fibers 110a and the light medium tube 120. To facilitate directing light emitted from the light emitting surface 124 of optical medium tube 120 into the optical fibers 110a, interior surfaces of the optical fiber housing 140 may be coated with a reflecting material 132.

As another method of enhancing the optical coupling between optical medium tube 120 and the light source 116 and the optical fibers 110a, a connection housing 150 enclosing optical medium tube 120 therein can be provided as shown in FIG. 9C. To minimize the light loss at the incident surface and the emitting surface of the optical medium tube 120, a reflection material 132 may be coated on interior surfaces of the connection housing 150. The use of the reflection material 132 may enhance directing the light emitted from the light source 116 to become incident into the optical medium tube 120. Further, the reflecting material enhances directing of the light entering the optical medium tube 120 to be incident into the optical fibers 110a. Accordingly, optical transmission efficiency may be ensured and improved.

Figure 10A:
FIGS. 10A, 10B, and 10C illustrating various examples of light sources usable with embodiments of the present invention.
Figure 10B:
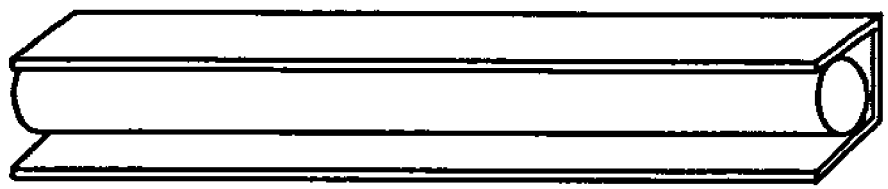
Figure 10C:
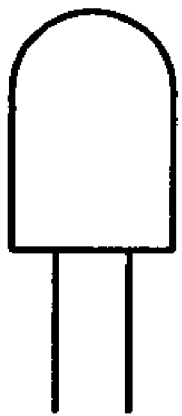

Linearly shaped or line light sources 116 such as the light sources formed of LED arrays and fluorescent lamps such as the cold cathode fluorescent lamp (CCFL) or the external electrode fluorescent lamp (EEFL) may be used with the optical medium tube shown in FIG. 9, as illustrated in FIGS. 10A and 10B, although the use of such sources may not contribute to reduced electrical power consumption. Alternatively, a point light source 216 such as a single LED may be used as shown in FIG. 10C. In a backlight unit according to a embodiment of the current invention and using a point light source, the optical medium tube 220 may include a light guide having a similar structure to light guide panel of an edge type backlight unit of a typical liquid crystal display panel as shown in FIG. 11A.

Figure 1:
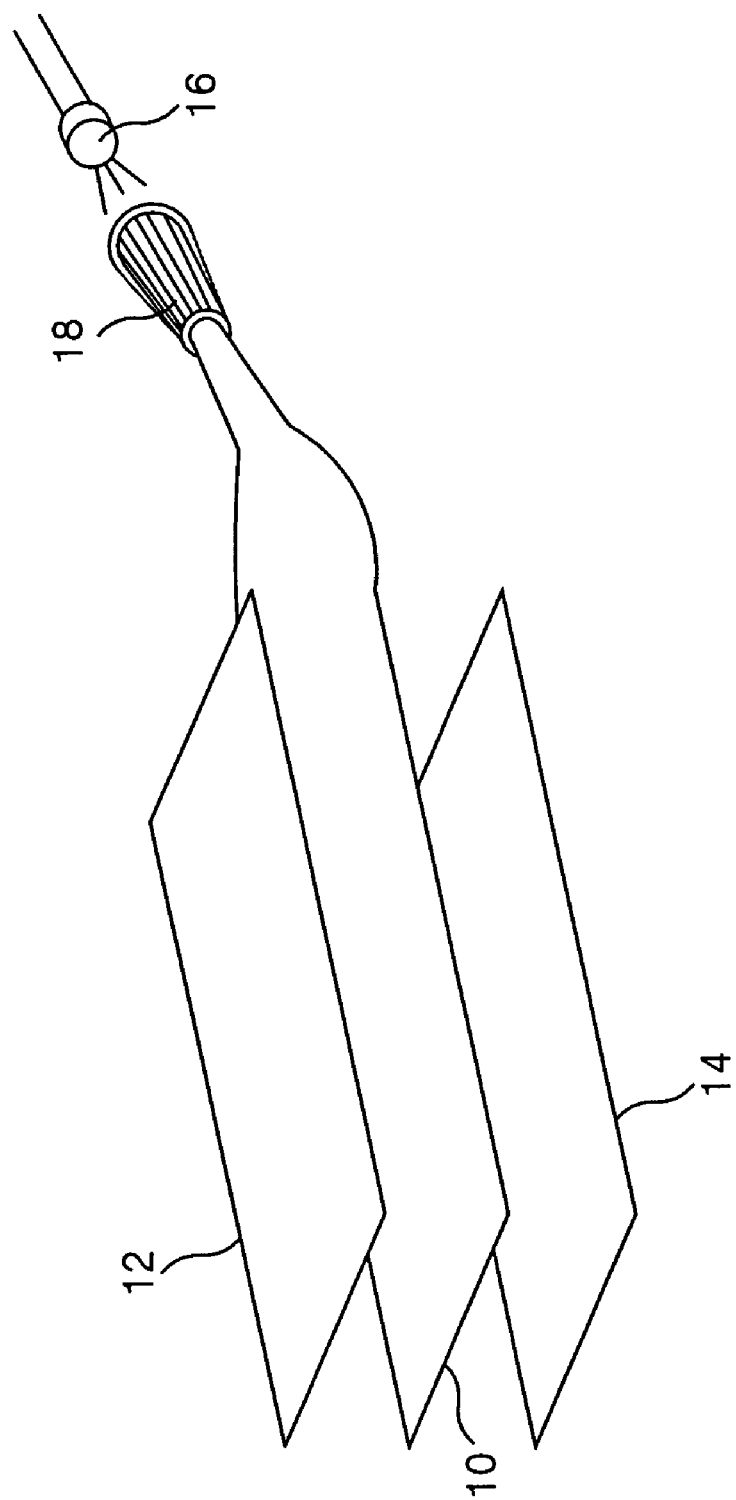
FIG. 1 is a diagram illustrating example of a flexible backlight unit using an optical fiber of the related art.
Figure 2:
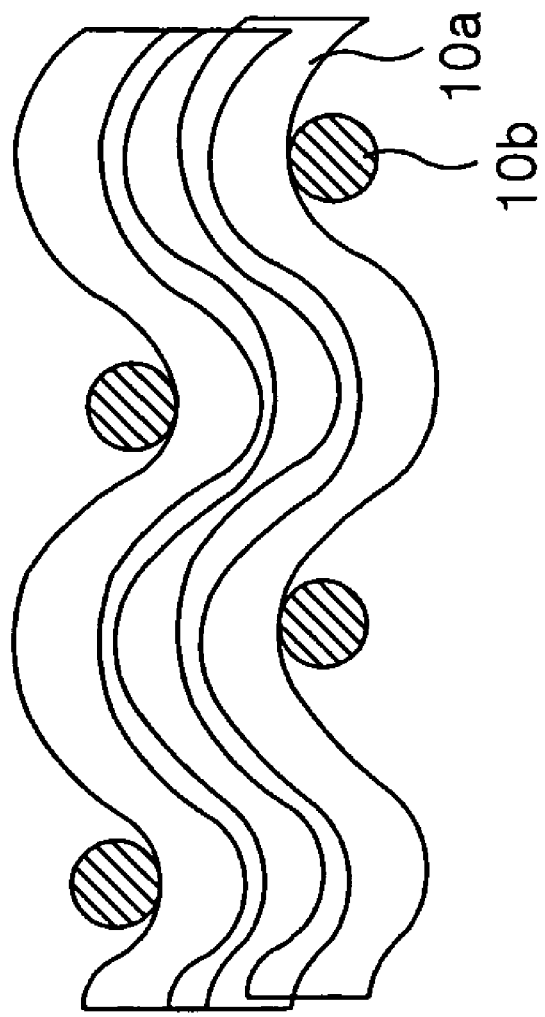
FIG. 2 is a view schematically illustrating in detail using the optical fibers to forms a light emitting plate of a flexible backlight unit of the related art.
Figure 3:
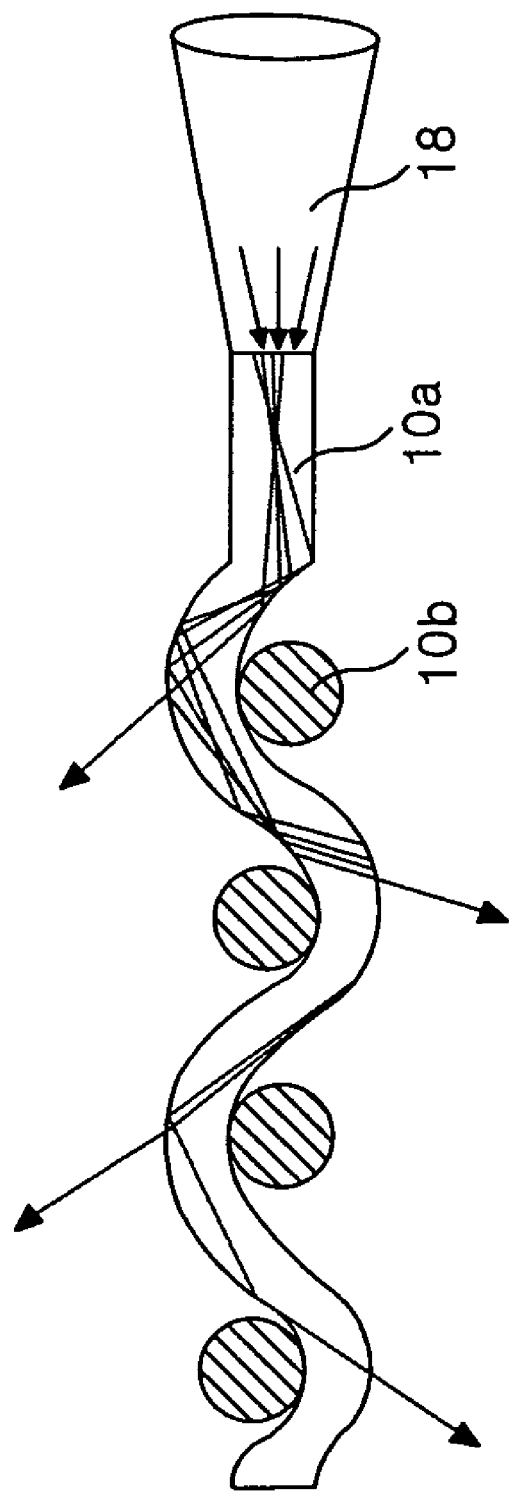
FIG. 3 is a diagram illustrating the light emission from optical fibers in a light emitting plate of a flexible backlight unit of the related art.
Figure 4:
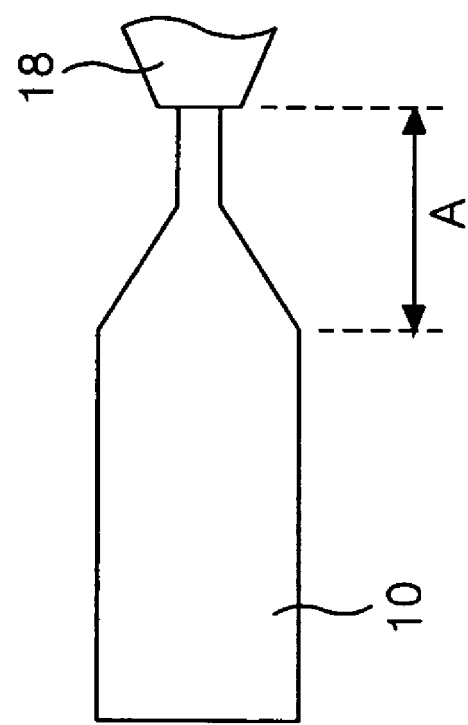
FIG. 4 is a plan view illustrating the bundle area of a flexible backlight unit using an optical fiber of the related art.
Figure 5:
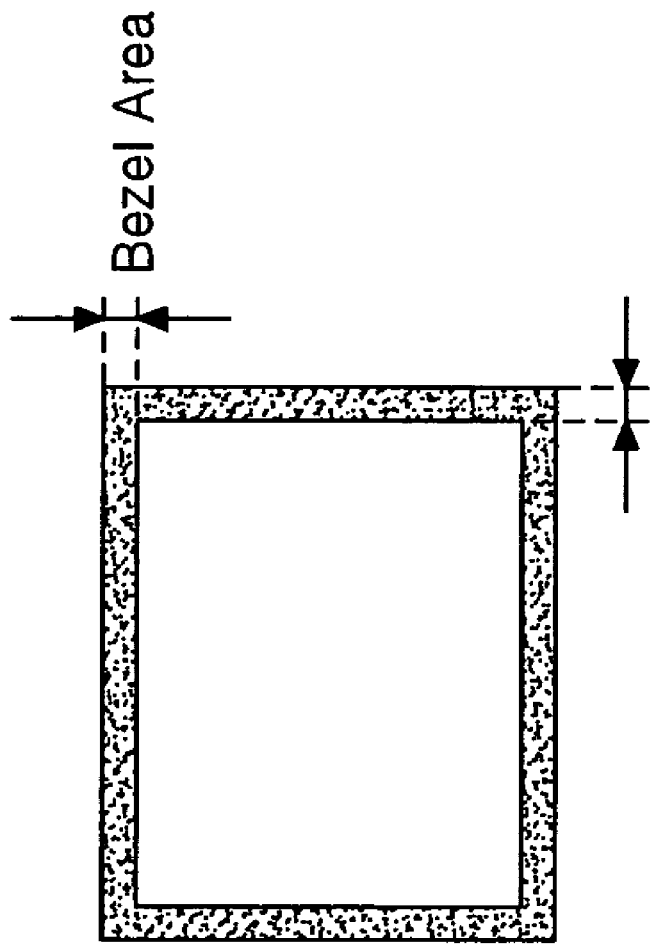
FIG. 5 is a plan view illustrating the bezel area of a typical liquid crystal display device.
Figure 6A:
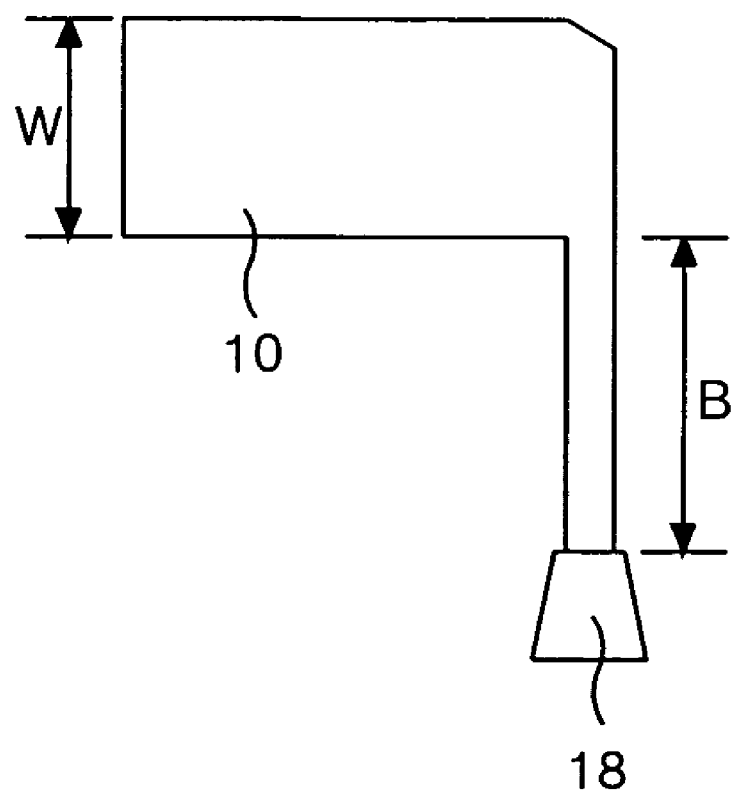
FIGS. 6A and 6B illustrate additional examples of a light emitting plate of a flexible backlight unit using an optical fiber of the related art.
Figure 6B:
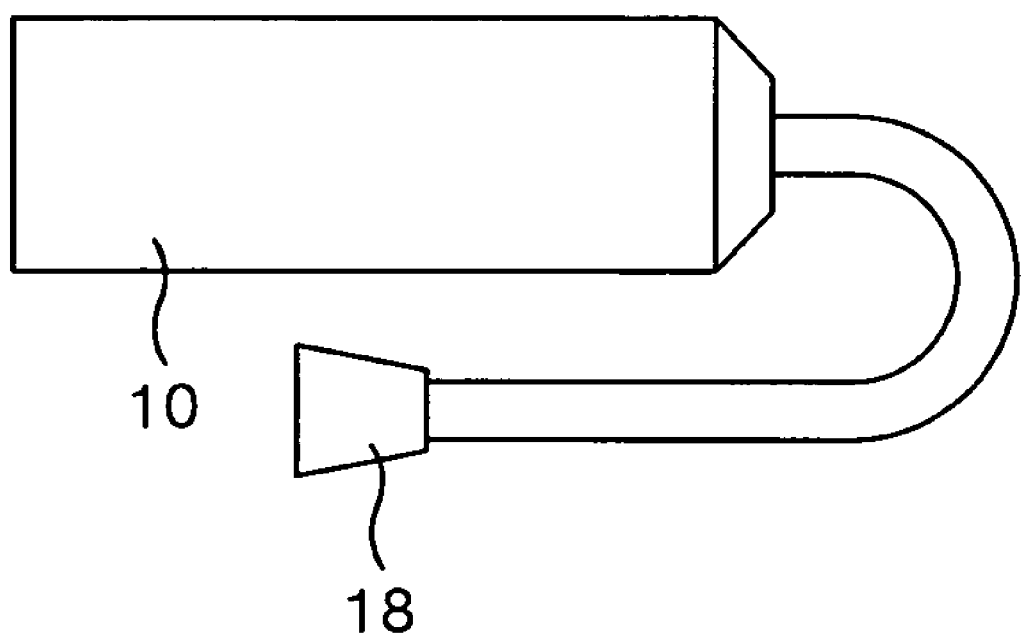

Hereinafter, a detailed description of a second embodiment of the current invention employing a point light source is made with reference to FIG. 1A. The light source may include a single LED. The light emitting plate 210 is identical that described above with reference to FIG. 7. First ends of the optical fibers 210a are disposed parallel to each other and adjacent to the light emitting surface 224 of an optical medium tube 220. The point light source 216 is disposed adjacent to the light incident surface 222 of the optical medium tube 220 to optically couple light from the light source into the optical medium tube. In the illustrated embodiment of the present invention, the light incident surface 222 is in a plane substantially perpendicular to the light emitting surface 224 of the optical medium tube 220. For example, the point light source 216 may be located within a bezel area which forms substantially a right angle with the bezel area where the optical medium tube 220 is located. Accordingly, the optical medium tube 220 may be structured to encompass and house the point light source 216 at a side surface of the optical medium tube 220. The path of the incident light from the point light source 216 is then guided through angle of about 90° in the optical medium tube 220 to be guided to the light emitting surface 224 of the optical medium tube 220. That is, the surface facing the light emitting surface 224 of the optical medium tube 220 is a light reflecting surface 226. By comparison, the light reflecting surface was a light incident surface 122 in the optical medium tube 120 of the embodiment illustrated in FIG. 7. The light reflecting surface 226 of the optical medium tube 220 reflects the incident light towards the light emitting surface 224 to which the optical fibers 210a are optically coupled. To accomplish this redirection, a reflective material 221 can be coated on the light reflecting surface 226 of the optical medium tube 220. Further, in order to increase the reflectivity and allow guiding the reflected light onto the light emitting surface, the optical medium tube 220 can be formed as a waveguide structure. For example, the light emitting surface 224 of the optical medium tube 220 is disposed in the horizontal direction without inclination, but the light reflecting surface 226 has a non-zero inclination with respect to the light emitting surface, so that the light reflecting surface 226 converges towards the light emitting surface along the direction away from the light source. As a result, the width of the optical medium tube 220 narrows in the direction along the optical medium tube 220 away from the point light source 216. The optical medium tube 220 may be formed of a transparent plastic material such as PMMA (polymethyl methacrylate) or from another transparent plastic material such as polycarbonate or acrylic.

Figure 11A:
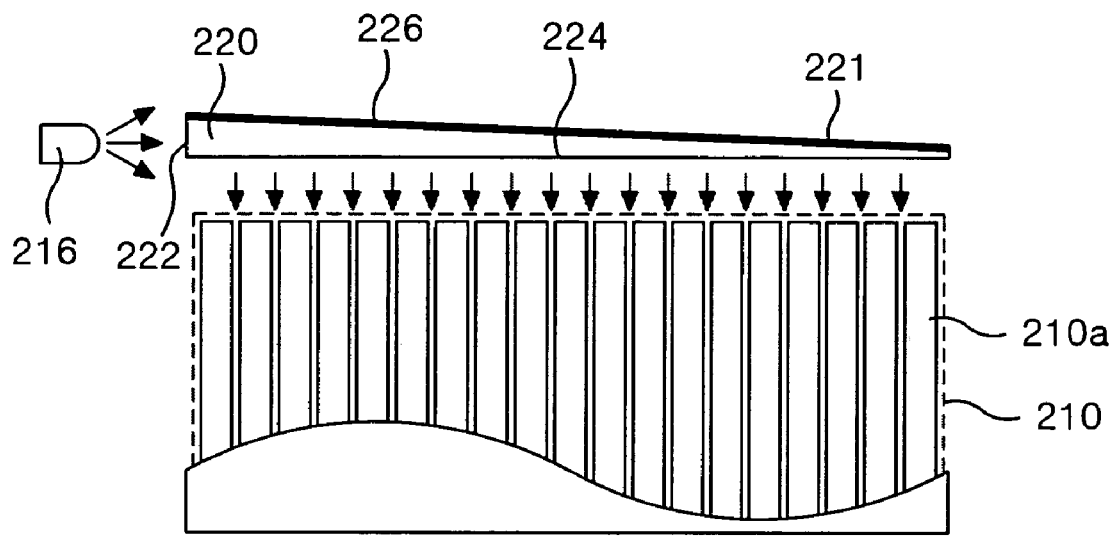
FIGS. 11A and 11B illustrate a flexible backlight unit using an optical fiber according to a second embodiment of the present invention.
Figure 11B:
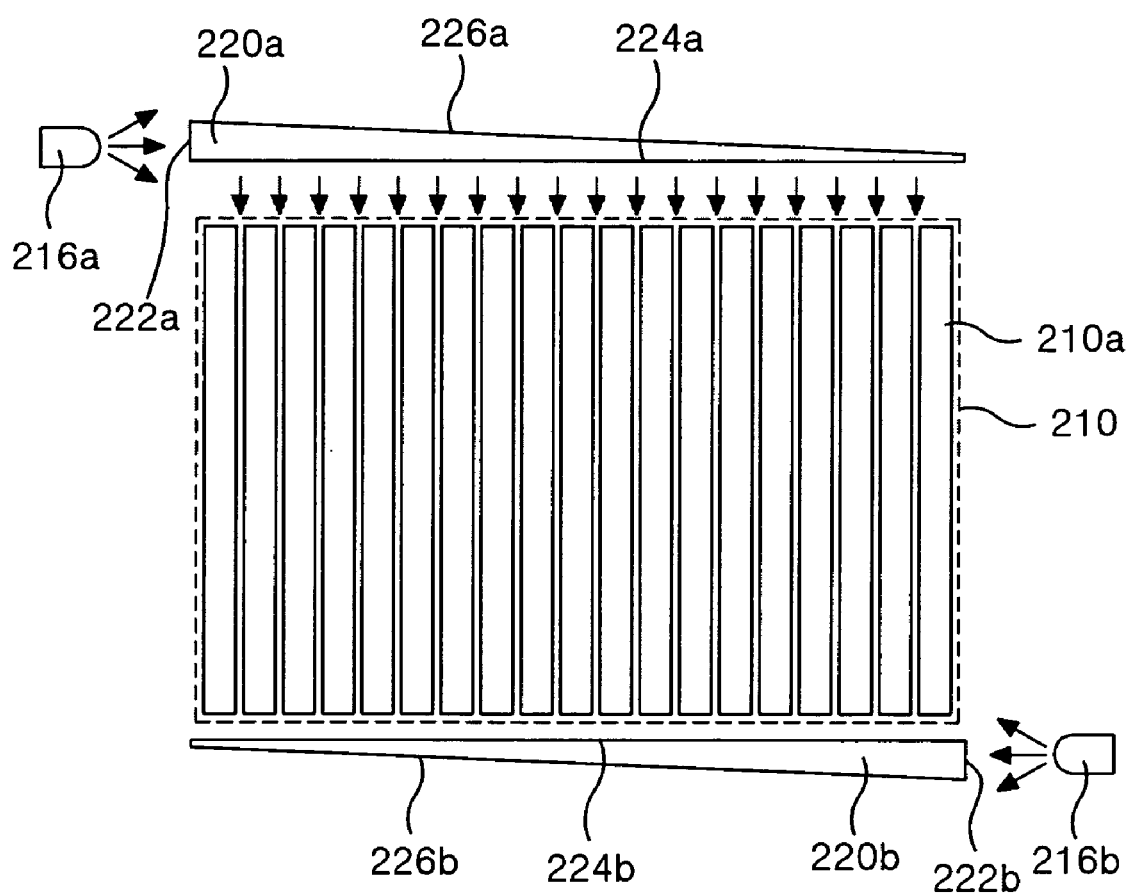

In the backlight unit using optical fibers according to the embodiment of the present invention illustrated in FIG. 11A, a single point light source is located a single end of the optical fibers. However, the invention is not limited to being practiced with a single point light source, and the invention may be practiced in a structure having an additional point light source located at the opposite ends of the optical fiber whereby light is simultaneously supplied to both ends of the optical fiber, as shown in FIG. 11B. The first ends of the optical fibers 210a of the light emitting plate 210 are coupled to the light emitting surface 224a of the first optical medium tube 220a having a light reflecting surface 226a and a light incident surface 222a. The opposite ends of the optical fibers 210a are coupled to the light emitting surface 224b of the second optical medium tube 220b having light reflecting surface 226b and a light incident surface 222b. A first point light source 216a is coupled to the light incident surface 222a of the first optical medium tube 220a. A second point light source 216b is coupled to the light incident surface 222b of the second optical medium tube 220b. The first point light source 216a and the second point light source 216b can be disposed in a diagonally symmetric structure as illustrated in FIG. 11B.

The backlight unit having such a configuration and operational effect may be applied as the backlight of the liquid crystal display device and but may also be applied as the backlight of an electrophoresis display such as an E-Link. Such a backlight may also be applied as the backlight for a flexible flat panel display device.

Figure 12A:
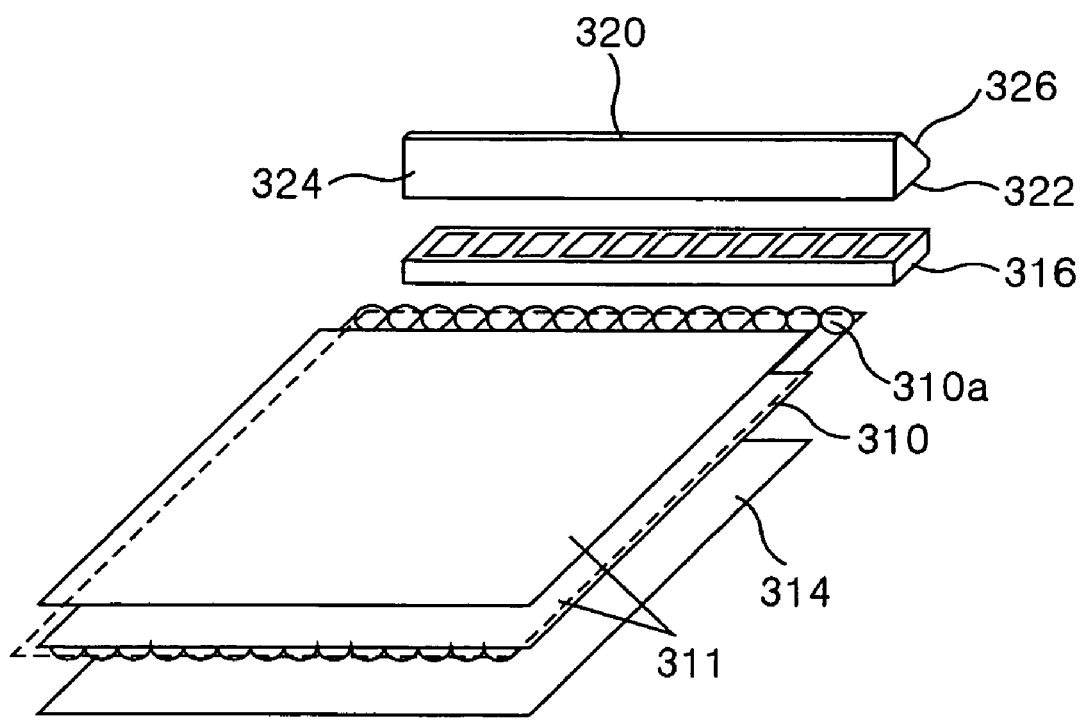
FIGS. 12A and 12B illustrate a third embodiment of the backlight unit using optical fibers according to the present invention.
Figure 12B:
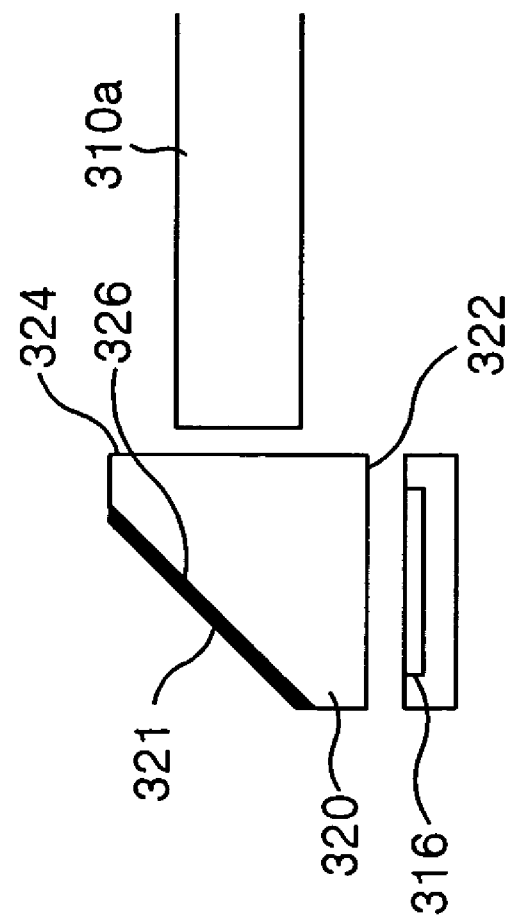

In the backlight unit using optical fibers according to the third embodiment of the present invention illustrated in FIGS. 12A and 12B, the line light source 316 is disposed below and facing the lower surface of the optical medium tube 320. By locating the light source 316 below the optical medium tube 320, the bezel space used for housing the optical medium tube may be reduced. The optical medium tube 320 may have the shape of a triangular prism or substantially the shape of a rectangular prism having one or more of the corners truncated as shown in FIG. 12B. Light from the light source 316 enters into the optical medium tube 320 through the light incident surface 322 adjacent to the light source. The incident light is reflected at the reflecting surface 326 and is guided by the optical medium tube 320 to a light emitting surface 324 in a plane substantially perpendicular to the plane of the light incident surface. First ends of the optical fibers are disposed adjacent to the light emitting surface 324 to form an optical coupling to transmit light emitted from the light emitting surface 324 into the optical fibers 310a. In order to reflect the incident light at the reflecting surface 326 more effectively, a reflecting material or film 321 may be coated or added onto the out side surfaces of the optical medium tube 320. For example, a reflecting material 321 may be coated on the reflecting surface 326. When the light source 316 is disposed below the optical medium tube 320, the thickness of a flat panel may be increased to accommodate the combined height of the light source 316 and the optical medium tube. The LED of the light source 316 may be line light source arraying employing multiple of chip type LEDs as shown in the FIG. 10A. A housing similar to the housings illustrated in FIG. 9B or 9C may be employed to reduce the loss of light between the line light source 316 and the optical medium tube 320.

As described above, the backlight unit according to embodiments of the present invention optically couples the optical fibers and the light source through the optical medium tube, coupling the light source to the optical medium tube at a light incident surface of the optical medium tube and coupling the optical medium tube to the optical fibers at a second light emitting surface of the optical medium tube, and directs the light emitted from the light source to the optical medium tube to be incident to each of the optical fibers through the optical medium tube. Herein, the optical medium tube of which width may be significantly narrower than the bundled area of the optical fibers of the related art used for transmitting the light from the light source to the optical fibers. Accordingly, by using a flexible backlight unit according the present invention, the bundle area of the light emitting plate of the backlight unit using optical fibers of the related art may be eliminated or reduced in size. Further, a flexible backlight unit according the present invention may allow reducing or minimizing the bezel of a display.

In addition, the backlight unit according to the present invention may use a light source having low electric consumption power such as point light source using single LED to distribute light over a large area without significant light loss, allowing the backlight unit according to the present invention to be used in mobile display devices with low power consumption.

Further, the backlight unit using optical fiber uses the optical medium tube which can scatter the light to have uniform light intensity and guide the uniformly scattered light to the optical fiber. The backlight may have the uniform light intensity and luminescence over the large area of the display panel to facility the display of high quality images on the display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit using optical fibers, comprising:
   a light source;
   an optical medium tube having a light incident surface to optically couple light from the light source into the optical medium tube and a light emitting surface to emit light guided by the optical medium tube;
   a light emitting plate including plurality of optical fibers having first ends optically coupled to the light emitting surface of the optical medium tube to receive light from the light emitting surface,
   where the first ends of the optical fibers are substantially parallel and coplanar with each other.

2. The backlight unit using optical fibers according to claim 1, the light incident surface and the light emitting surface of the optical medium tube are substantially parallel.

3. The backlight unit using optical fibers according to claim 1, wherein the light incident surface and the light emitting surface of the optical medium tube are substantially perpendicular.

4. The backlight unit using optical fibers according to claim 3, wherein the optical medium tube is substantially shaped as a rectangular prism.

5. The backlight unit using optical fibers according to claim 3, wherein a surface of the optical medium tube facing the light emitting surface is a light reflecting surface to redirect light to the light emitting surface.

6. The backlight unit using optical fibers according to claim 5, wherein the light reflecting surface is formed by adding a reflective film on the surface of the optical medium tube facing the light emitting surface.

7. The backlight unit using optical fibers according to claim 5, wherein the light reflecting surface is coated with a reflective material.

8. The backlight unit using optical fibers according to claim 5, wherein the light reflecting surface is inclined to converge towards the light emitting surface along a direction away from the light incident surface.

9. The backlight unit using optical fibers according to claim 3, wherein the light source is a point light source.

10. The backlight unit using optical fibers according to claim 1, wherein the light source is a line light source.

11. The backlight unit according to claim 10, wherein the line light source includes an LED array.

12. The backlight unit according to claim 10, wherein the line light source includes a fluorescent lamp.

13. The backlight unit according to claim 12, wherein the fluorescent lamp is one of a CCFL and an EEFL.

14. The backlight unit using optical fibers according to claim 1, further comprising a reflective medium layer on exterior surfaces of the optical medium tube excluding the light emitting surface and the light incident surface.

15. The backlight unit using optical fibers according to claim 1, further comprising a housing having a first housing portion enclosing the light source and the light incident surface and a second housing portion enclosing the first ends of the optical fibers and the light emitting surface.

16. The backlight unit using optical fibers according to claim 15, wherein the housing includes a reflective material on interior surfaces of the housing.

17. The backlight unit using optical fibers according to claim 1, further comprising a first housing enclosing the light source and the light incident surface and a second housing enclosing the first ends of the optical fibers and the light emitting surface.

18. The backlight unit using optical fibers according to claim 17, further comprising a reflective material on interior surfaces of at least one of the first and second housings.

19. The backlight unit using optical fibers according to claim 1, wherein the optical medium tube includes a first optical medium tube to optically couple the first end of the plurality of optical fibers with a light emitting surface of the first optical medium tube and a second optical medium tube to optically couple a second end of the plurality of optical fibers with a light emitting surface of the second optical medium tube; and
   wherein the light source includes a first light source optically coupled with a light incident surface of the first optical medium tube and a second light source optically coupled with a light incident surface of the second optical medium tube.

20. The backlight unit using optical fiber according to claim 1, further comprising a reflecting plate disposed below the emitting plate.

21. The backlight unit using optical fiber according to claim 1, further comprising one or more optical sheets disposed above the emitting plate.

* * * * *